United States Patent [19]

Brinkerhoff et al.

[11] Patent Number: 4,518,825
[45] Date of Patent: May 21, 1985

[54] TELEPHONE INTERCONNECT DETECTION SYSTEM

[75] Inventors: Jesse R. Brinkerhoff; Richard S. Brinkerhoff, both of King County, Wash.

[73] Assignee: Telecalc, Inc., Bellevue, Wash.

[21] Appl. No.: 540,991

[22] Filed: Oct. 11, 1983

[51] Int. Cl.³ .................. H04M 3/36; H04M 15/34
[52] U.S. Cl. ................ 179/11; 179/18 AD; 179/18 FH; 179/18 HA; 179/175.2 C
[58] Field of Search ........ 179/10, 11, 18 AB, 18 AD, 179/18 FH, 18 HA, 99 R, 175.2 C, 9, 175.2 R

[56] References Cited

U.S. PATENT DOCUMENTS

| | | | |
|---|---|---|---|
| 3,909,562 | 9/1975 | Lager | 179/175.2 R |
| 4,056,698 | 11/1977 | Dworak et al. | 179/175.2 C |
| 4,320,497 | 3/1982 | Mori et al. | 179/175.2 R |
| 4,330,688 | 5/1982 | Tiribelli | 179/175.2 R X |
| 4,424,421 | 1/1984 | Townsend et al. | 179/175.2 R |

Primary Examiner—Stafford D. Schreyer
Attorney, Agent, or Firm—Seed and Berry

[57] ABSTRACT

A telephone interconnect detection system for selectively determining, during operation, interconnection of a plurality of trunk lines with a plurality of set lines interconnected by a pbx or the like. The system includes a processor for selecting in sequential order ones of the trunk lines according to a predetermined logic, and generating trunk and set operation control signals; a pulse generator for generating a limited bandwidth and duration sensing pulse within the audio bandwidth of the pbx; a multiplexer for selectively applying one of the sensing pulses to one or more selected trunk lines for transmission of the pulse through the pbx; a selectively operable band-reject filter connected to the trunk lines and tuned to the frequency of the sensing pulse, the filter operating in response to the trunk operation signal to attenuate the pulse for inhibiting its outbound transmission over the trunk lines; a detector connected to the set lines for detecting the presence of the sensing pulse on any one or more of the set lines, and identifying those one or more set lines; and a selectively operable second band-reject filter connected to the set lines and tuned to the frequency of the sensing pulse, the filter operating in response to the set operation signal to attenuate the sensing pulse for inhibiting its outbound transmission over the set lines. The first and second filters include a plurality of individual two stage filters, one filter being connected to each of the trunk and set lines.

20 Claims, 5 Drawing Figures

SENSING PULSE

TELEPHONE INTERCONNECT DETECTION SYSTEM

DESCRIPTION

1. Technical Field

The present invention relates generally to information gathering and processing systems for use with a pbx or the like to determine, analyze and report telephone usage information, and, more particularly, to such a system which can determine during actual operation the various interconnect patterns of the telephone system trunk lines with the telephone set lines which exist from time to time.

2. Background Art

In many businesses using large numbers of telephone sets, it is important analyze and to monitor telephone system usage to obtain maximum efficiency and cost effectiveness. A very typical situation involves a company employing numerous telephone operators who primarily answer calls from the public or make calls to the public, such as providing information to customers, taking orders from customers, or generally conducting the business of the company. In such situations, it is important to gather raw calling data from the telephone system for analysis and to provide real-time monitoring of telephone usage. If the operator of a particular telephone set is shown not to be utilizing the set as efficiently and effectively as desired, appropriate remedial steps can be taken. Additionally, if the telephone system is shown not to be operating at peak efficiency, such as when incoming calls are being delayed too long before answering or telephone sets are not being used frequently enough, appropriate steps may be taken to rectify the situation by adding or deleting telephone sets and operators, or rescheduling operator work hours. Other types of information on telephone usage may also be gathered and are useful in making efficient and effective use of the telephone system, such as the average duration of telephone calls made over the telephone system or by particular operators. In addition to direct savings in money, the customers of the company may be better served.

There are many systems available which operate in conjunction with a pbx or the like to gather information and process it based on monitoring of telephone system trunk lines and telephone set lines. In the past, however, these systems were unable to determine precisely which trunk lines were connected to which set lines since the connections are accomplished internally by the switching mechanisms of the pbx, typically with the pbx providing no information about the switching patterns it accomplishes. Consequently, the actual interconnections of the trunk lines and set lines were unknown, and any information on trunk line usage and on set line usage was gathered independently of the other and could not be accurately correlated to give information about particular telephone trunk and set lines. This limited the reliability and scope of most usage analysis based on this information and limited the usefulness of real-time monitoring of the telephone system. With such a "blind" system, one source of error resulted from a conference call requiring many set lines to be connected to one trunk line or many trunk lines to be connected to one set line since, without further information, the system had to assume that one set line was connected to only one trunk line, and vice versa, at one time.

With some pbx systems which are now being maufactured, the capability exists of knowing and recording which trunk lines are assigned to which set lines, based on the pbx providing a map of the internal connections which have been made by the pbx. This allows information gathering systems used with these pbx's to avoid the errors and limitations discussed above. A pbx utilizing such a "smart" system, as opposed to a "blind" system, is far superior. However, many pbx and the like are still in use which use a blind system; and due to the expense involved, replacement of a blind system pbx is not always desirable or feasible. Furthermore, a company considering the purchase of a new pbx may well decide the expense of obtaining the smart system feature is not worthwhile or that such a sophisticated pbx is unwarranted. It is noted that while an information gathering system used with a smart system pbx may provide the desired capabilities, the information gathering system will not avoid the problems discussed above when used with a blind system pbx.

It will therefore be appreciated that there has been a significant need for an information gathering and processing system which can operate with an existing blind system pbx to determine the particular interconnect patterns between the trunk lines and the set lines which occur at various times during operation of the pbx. Preferably, the information gathering and processing system should be unobtrusive, with the users having telephone sets connected to the trunk and set lines being undisturbed by the operation of the system. The system should operate with all existing pbx units regardless of the type of switching and signal processing used by the pbx, whether it be patch cords, mechanical or electrical switches, fiberoptics, digitalization, or any other technology. The present invention fulfills these needs, and further provides other related advantages.

DISCLOSURE OF INVENTION

The present invention resides in a telephone interconnect detection system for selectively determining, during operation, interconnection of a plurality of first telephone lines with a plurality of second telephone lines interconnected by a switching device, one of the plurality of first or second lines being telephone system trunk lines and the other being telephone set lines, and the switching device being a pbx or the like. The system includes means for selecting at least one line of the plurality of first lines according to a predetermined logic; means for generating a limited duration sensing signal having a frequency within the audio bandwidth of the switching device; means for selectively applying the sensing signal to the selected first line; means for inhibiting outbound transmission of the sensing signal over the selected first line, whereby the sensing signal will be transmitted through the switching device to one or more of the plurality of second lines connected to the selected first line by the switching device, but will go substantially undetected by a user with a telephone set connected to the selected first line; means for detecting the presence of the sensing signal on any one of the plurality of second lines, and indicating said one of more second lines whereon the sensing signal is detected, whereby the interconnect pattern of the selected first line with the one or more second lines existing during the duration of the sensing signal is determined; and means for inhibiting outbound transmission of the sensing signal over the one or more second lines, whereby the sensing signal will go substantially undetected by a user with a telephone set connected to one of the one or more second lines.

The means for generating a limited duration sensing signal is a pulse generator which generates a limited bandwidth sensing signal comprising a pulse with a substantially sinusoidal waveform having a substantial phase shift partially through its period. The waveform has a gradually reduced amplitude at its beginning, phase shift, and ending portions, and may be selectively generated as a high-level or a low-level amplitude, the low-level amplitude being used when an off-hook condition exists on a telephone line.

The means for selecting the first lines is a processor which generates an operation signal for controlling the operation of the system. The means for inhibiting outbound transmissions of the sensing signal over the first lines and the second lines are selectively operable first and second filters connected to the first and second lines, respectively. The filters are operable in response to the operation signal and attenuate the sensing pulse.

More specifically, the filters include a bandreject filter connected to each of the first and second lines, with a bandwidth at least coincidental with the pulse bandwidth. The filters are individually and selectively activated in response to the operation signal. In the presently preferred embodiment of the invention, the filters include a parallel resonant inductance-capacitance circuit connected in series with the telephone line, and a series resonant inductance-capacitance circuit connected in parallel with the telephone line, with the circuits being tuned to the sensing pulse frequency and each circuit being activated by a switching device responsive to the operation signal.

The processor repeatedly commands the pulse generator to apply sensing pulses to particular ones of the first lines to establish an interconnect pattern history. The system includes means for correlating subsequently determined interconnect patterns to determine if another one or more of the selected first lines is interconnected to the same one or more second lines, whereby an interconnect pattern involving more than one of the first lines may be determined. Alternately, a second detector may be connected to the first lines for detecting the presence of the sensing pulse on one or more of the first lines other than the selected first line on which the sensing pulse is applied to identify the other one or more first lines.

During operation, the detector repeatedly samples the second lines for the presence of the sensing pulse during the duration of one of the transmitted sensing pulses.

Other features and advantages of the invention will become apparent from the following more detailed description, taken in conjunction with the accompanying drawings.

BEST MODE FOR CARRYING OUT THE INVENTION

As shown in the drawings for purposes of illustration, the present invention is embodied in a telephone interconnect detection system, indicated generally by reference numeral 10. The detection system 10 selectively determines, during operation, interconnect patterns of a plurality of telephone trunk lines 12 with a plurality of telephone set lines 14 interconnected by a telephone switching device 16, such as a pbx or the like. Each trunk line 12 comprises a pair of standard tip and ring lines $T_T$ and $R_T$, respectively, provided by the telephone company central office. A remote user of a telephone set (not shown) is connected to a trunk line 12 through the telephone company central switching equipment (not shown). Likewise, each set line 14 comprises a pair of tip and ring lines $T_S$ and $R_S$, respectively, to which the local user has a telephone set (not shown) connected.

In response to incoming and outgoing calls and the various instructions of the local user, the switching device 16 establishes interconnections between the trunk lines 12 and the set lines 14. The switching may simply be the connection of one trunk line 12 with one set line 14. For outgoing conference calls, the switching may involve the connection of multiple trunk lines 12 to one or more set lines 14, or for incoming conference calls, the switching may involve the connection of multiple set lines 14 to one trunk line 12. Additionally, the switching device 16 may perform other standard operations in response to the instructions of the local user, such as placing calls on "hold" and transferring calls, which require switching of trunk and set lines.

The telephone interconnect detection system 10 of the present invention is incorporated into an information gathering and processing system which monitors trunk and set line activity, records raw telephone usage data, and processes the data for analysis and real-time telephone usage monitoring purposes. Since the design and operation of information gathering and processing equipment which provide such basic functions is conventional and well known, it will be described herein only in general terms as is necessary to understand the operation and design of the detection system 10 of the present invention.

Figure 1:
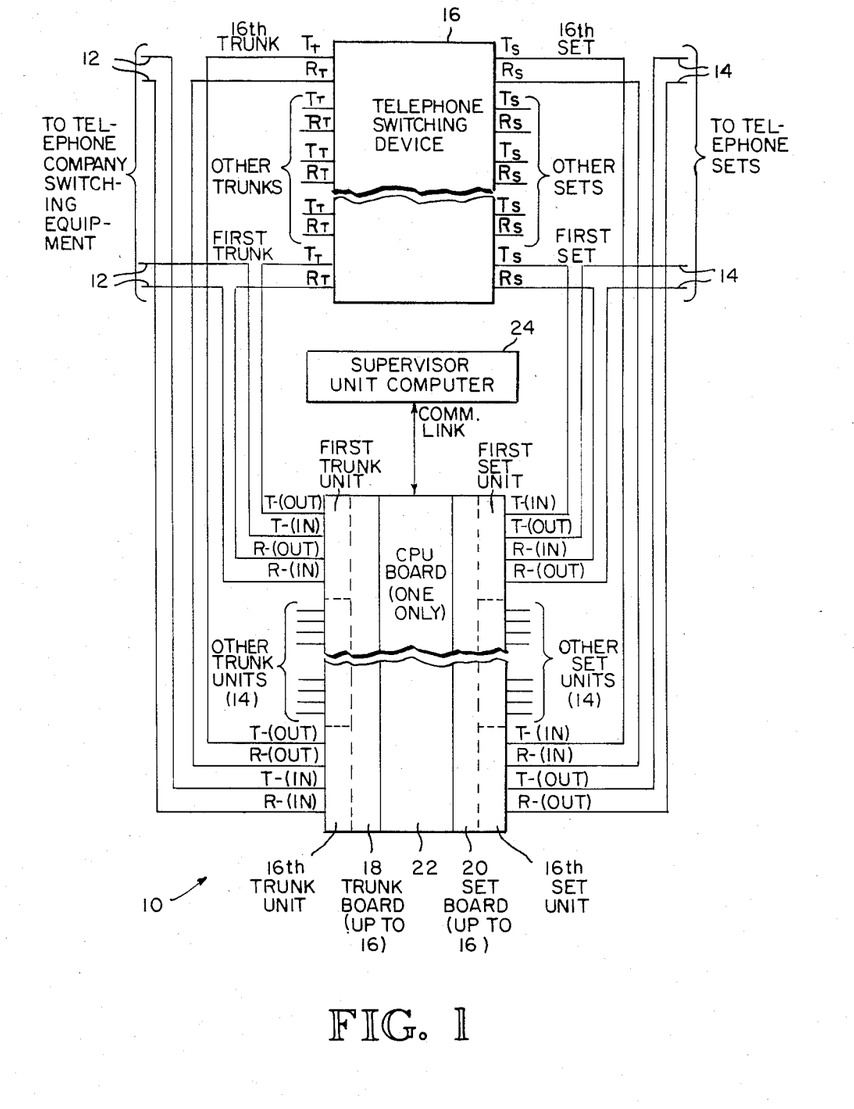
FIG. 1 is a schematic drawing of a telephone interconnect detection system embodying the present invention, shown connected to a telephone switching device.

In the presently preferred embodiment of the invention, each of the trunk tip and ring lines $T_T$ and $R_T$ are effectively interrupted and passed through the detection system 10, as is shown by way of example for a first trunk line, and a sixteenth trunk line in FIG. 1. Similarly, each of the set tip and ring lines $T_S$ and $R_S$ are effectively interrupted and passed through the detection system 10, as shown by way of example for a first set line and a sixteenth set line in FIG. 1. The detection system 10 is contained on a trunk board 18 and a set board 20 which each interface with a CPU board 22. The CPU board 22 interfaces with a supervisor unit computer 24 which provides much of the data processing, analysis and storage capability using the raw calling data provided by the operation of the trunk, set and CPU boards 18, 20 and 22. Collectively, the trunk, set and CPU boards 18, 20 and 22, and the supervisor unit computer 24 form an information gathering and processing system utilizing the detection system 10 of the present invention.

To facilitate description of the illustrated embodiment of the invention, the terminals of the trunk board 18 to which the trunk tip lines $T_T$ are connected are designated T (in) and T (out), with the T (in) terminal being connected to the trunk tip line going to the telephone company switching equipment and the T (out) terminal being connected to the trunk tip line going to the switching device 16. Similarly, the terminals of the trunk board 18 to which the trunk ring lines $R_T$ are connected are designated R (in) and R (out), with the R (in) terminal being connected to the trunk ring line going to the telephone company switching equipment and the R (out) terminal being connected to the trunk ring line going to the switching device 16. In the presently preferred embodiment of the invention, the trunk board 18 includes sixteen trunk units, identified as the first through sixteenth trunk units. Each of these trunk units is connected to a trunk line 12 and provided with the four terminals discussed above for connection to the trunk tip and ring lines. The CPU board 22 can service up to sixteen of each of the trunk and set boards 18 and 20, providing a capability of handling 256 telephone lines.

In the same fashion, the set board 20 has sixteen set units, identified as the first through sixteenth set units. Each of these set units is provided with four terminals for connection to the set tip and ring lines $T_S$ and $R_S$ of one set line 14. The terminals to which the set tip lines $T_S$ are connected are designated T (in) and T (out), with the T (in) terminal being connected to the set tip line going to the switching device 16 and the T (out) terminal being connected to the set tip line going to the local user's telephone set. The remaining two terminals to which the set ring lines $R_S$ are connected are designated R (in) and R (out), with the R (in) terminal being connected to the set ring line going to the switching device 16 and the R (out) terminal being connected to the set ring line going to the local user's telephone set.

Figure 2:
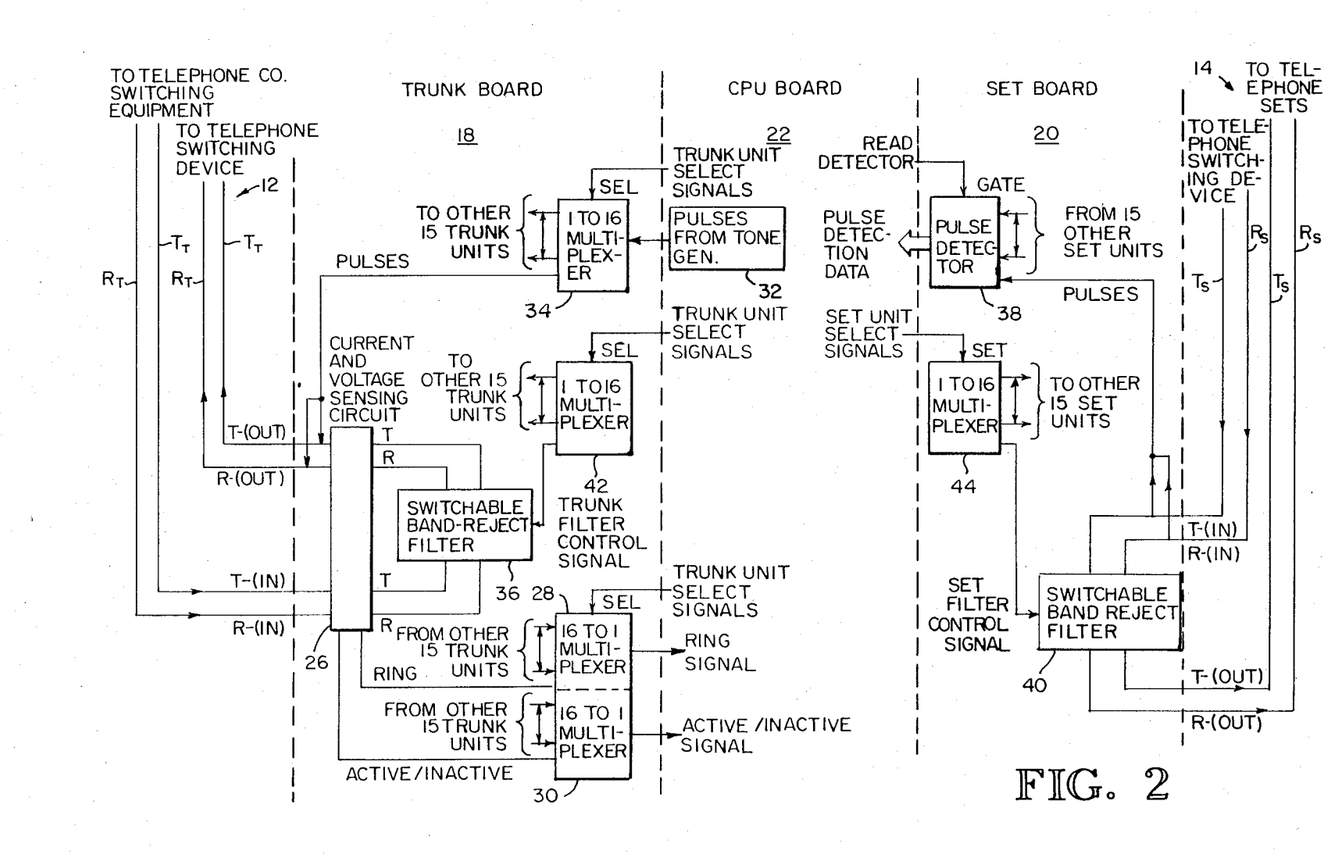
FIG. 2 is a more detailed schematic drawing of the detection system shown in FIG. 1.

The trunk, set and CPU boards 18, 20 and 22 are shown in more detail in FIG. 2, which, for purposes of illustration, shows one trunk unit having a trunk line 12 connected to its terminals T (in/out) and R (in/out), and one set unit having a set line 14 connected to its terminals T (in/out) and R (in/out). As with conventional telephone information gathering and processing systems, the trunk board 18 is equipped with a current and voltage-sensing circuit 26 to monitor the condition of the trunk line 12 and indicate a on-hook, an off-hook or a ringing condition. The voltage-sensing portion of the circuit 26 senses the presence of high voltage on the trunk line 12 indicating ringing, and generates a ring signal which is provided to a multiplexer 28. The multiplexer 28 receives such a ring signal from all sixteen trunk units of the trunk board 18.

The current-sensing portion of the circuit 26, in conventional fashion, senses the presence or absence of a loop current on the trunk line 12 to indicate an on-hook condition (i.e., inactive) or an off-hook condition (i.e., active), and generates an active/inactive signal to a second multiplexer 30. The multiplexer 30 receives such an active/inactive signal from all sixteen trunk units of the trunk board 18, The multiplexers 28 and 30 transmit their respective ring signals and active/inactive signals, if any, sensed by a particular trunk unit, to the CPU board 22 in response to a trunk unit select signal. As will be discussed below, the trunk unit select signal is a command signal from the CPU board which controls the operation of particular trunk units. The information supplied by the ring and active/inactive signals is used according to the predetermined logic to determine which trunk unit the trunk unit select signal will command and how frequently the trunk unit will be commanded. For example, the signals provide the means for the CPU board 22 to selectively check specific trunk lines 12 or groups of trunk lines for busy, on-hold, idle or ringing status, and changes in status used to time determinations of the interconnect pattern of the trunk by the detection system 10. As will become apparent, the trunk unit select signal is an operation signal which generally controls the operation of the detection system 10.

The detection system 10 of the present invention includes a tone generator 32 for the generation of sensing pulses which are selectively applied through a multiplexer 34 to selected trunk line 12 for transmission through the switching device 16, with the trunk unit select signal from the CPU board 22 indicating the trunk unit, and hence the trunk line, to which the pulse is applied. To inhibit transmission of the sensing pulse over the trunk line 12 in an outbound direction to a remote user with a telephone set connected to the trunk line, a switchable filter 36 is provided. The filter 36 is interposed between the point of application of the sensing pulse to the trunk line 12 and the input tip and ring terminals T (in) and R (in) of the trunk unit to which the trunk line receiving the pulse is connected.

As also shown in FIG. 2, the set board 20 includes a pulse detector 38 for detecting the presence or absence of the sensing pulse generated by the tone generator 32 and received on the set lines 14. A switchable filter 40 is interposed between the point of pickup of the sensing pulse from the set line 14 and the output tip and ring terminals T (out) and R (out) of the set unit. The filter 40 inhibits outbound transmission of the sensing pulse over the set line 12 to a local user with a telephone set connected to the set line.

Activation and deactivation of the trunk filter 36 is selectively controlled by the trunk unit select signal and the set filter 40 is selectively controlled by a set unit select signal provided by the CPU board 18 through a multiplexer 42 for the trunk board 18, and a multiplexer 44 for the set board 20. The set unit select signal is timed to occur with the trunk unit select signal, and is a command signal from the CPU board 18 which controls the operation of particular set units. The multiplexers 42 and 44 send the trunk and set filter control signals to the selected filters 36 and 40, respectively.

As previously discussed, the trunk board 18 contains sixteen trunk units servicing sixteen trunk lines 12. Application of a sensing pulse from the tone generator 32 to one or more of the trunk lines 12 is accomplished by the multiplexer 34 under control of the trunk unit select signal from the CPU board 22. The sensing signal is of relatively short duration and may be repeatedly applied to trunk lines to establish and track the interconnect patterns of the trunk and set lines 12 and 14. The trunk board 18 is provided with sixteen switchable filters 36, one for each trunk line 12. One or more of the trunk board filters 36 may be selectively activated or deactivated by the multiplexer 42 under the control of the trunk unit select signal. In accordance with the invention, the trunk line filter 36 associated with a particular trunk line is activated each time a sensing pulse is applied to the trunk line for at least the duration of the pulse, and preferably for a short time before and after, to inhibit outboard transmission of the sensing pulse, but to permit its travel to and through the switching device 16. The trunk line filters 36, as well as the set line filters 40, are band-reject filters tuned to selectively attenuate the frequency of the sensing signal.

To ensure passage of the sensing pulse through the switcing device 16, the tone generator 32 produces a pulse with a frequency of 2800 Hertz, which is within the 300–3,000 Hertz audio bandwidth standard for telephone equipment. By use of a sensing pulse with a frequency within the audio bandwidth of the switching device 16, the pulse will be transmitted through the switching device just as would any other audio signal independent of whether the switching device uses manually operated patch cords, mechanical or electronic switching, fiberoptics, digitalization or any other technology. A frequency at the high end of the audio bandwidth is selected for the sensing pulse so that a shorter pulse is required for its detection on the set lines 14. Furthermore, the higher frequency is lesser used in normal conversation and less likely to be present during the sending of the sensing pulse through the switching unit 10.

To minimize the possibility of detection by a remote or local user with a telephone set connected to the trunk line 12 or the set line 14, respectively, on which the sensing pulse appears, the pulse has a limited duration of approximately 10 milliseconds. It is noted that although the filters 36 and 40 will inhibit outbound transmissions of the sensing pulse, the filters will also inhibit transmission to users of any frequency component of speech or noise passing through the switching unit 16 which has the same frequency as the sensing pulse. Consequently, for a short 10 millisecond period, there will be a near absence of all sound and noise at the frequency of the sensing pulse, which, in some situations, could be detected by a user; however, it is believed that the lack of sounds at this frequency for such a short period of time will generally go unnoticed, and even if noticed, will be readily tolerated by telephone users.

The set board 20 contains sixteen set units, each servicing sixteen set lines and each provided with one filter 40. The set board filters 40 are activated and deactivated by the filter control signal provided by the multiplexer 44, which may select one or more, and many times all, of the set board filters to be activated. As previously discussed, the trunk unit select signal controls the sending of the sensing pulses over the trunk lines 12, and the set unit select signal controls the activation of the set board filters 40 in sync with the trunk unit select signal, thus the set board filters are activated in synchronization with the transmission of the sensing pulses over the trunk lines.

The set board 20 is provided with a pulse detector 38 which can simultaneously monitor the presence or absence of sensing pulses on each of the sixteen set lines 14. A read detector signal from the CPU board 22 provides a command to feed the pulse detection data from the pulse detectors 38, indicating whether a sensing pulse was detected or not, and on which of the set lines 14, to the CPU board.

In operation, the CPU board 22 selects one or more of the trunk lines 12 on which a sensing pulse is to be applied at any particular time, and reads the pulse detection data provided by the pulse detectors 38 to determine the presence or absence of the transmitted sensing pulse on the set lines 14. By the application of a pulse to one of the trunk lines 12 and reading which of the set lines 14 the pulse is detected on, the interconnect pattern of the trunk line and set lines established by the switching unit 16 may be determined. By sequentially applying sensing pulses to all of the trunk lines 12, the entire interconnect pattern established by the switching unit 16 may be determined. Subsequent application of sensing pulses to the trunk lines 12 in response to ring and active/inactive signals which indicate changes of state occurring in the trunk and set lines, and in any event, periodically, will provide an ongoing history of the interconnect patterns and duration of calls. The history is suppled by the CPU board 22 to the supervisor unit computer 24 for storage, analysis and reporting, and for real-time monitoring. By being able to determine the actual interconnect patterns of the trunk and set lines 12 and 14 during operation of the switching device 16, valuable and accurate information is provided on telephone usage.

It is noted that while in the illustrated, presently preferred embodiment of the invention, the sensing pulses are applied to the trunk lines 12 and detected on the set lines 14, this could be reversed, or pulses could be applied to both trunk and set lines in a time-sequence. The latter approach would enable the detection system to positively detect interconnect patterns for outgoing conference calls in which two or more trunk lines are connected to one or more set lines. Pulse detectors would be required for detecting pulses on the trunk lines.

With the illustrated, presently preferred embodiment of the invention, detection of outgoing conference calls can be accomplished in one of two ways. First, the interconnect pattern of each trunk line 12 can be compared with the interconnect pattern of each other trunk line to determine if two trunk lines are connected to the same group of set lines 14, in which case it may be reliably inferred that the two trunk lines are part of the same conference call. Alternatively, another pulse detector may be added to the trunk board 18 to detect the presence or absence of a sensing pulse on any trunk lines 12 other than the trunk line on which the sensing pulse is being applied by the trunk board. If the pulse is detected on another trunk line, it indicates that the switching device 16 has that trunk line interconnected with the trunk line on which the pulse is being applied and the set lines on which the pulse is detected.

To enhance the operation of the detection system 10, the sensing pulses applied to the trunks may have a high-level amplitude or a low-level amplitude, depending on the condition of the trunk line 12. Since a high-level amplitude sensing pulse is easier to detect on the set lines, it is desirable to use the high-level pulse whenever possible; however, the high-level amplitude pulse may be perceptible to users under some conditions. Consequently, to minimize the chances that a user will be able to perceive the presence of the sensing pulse, the high-level amplitude pulse is only used to pulse a trunk line when there has been no indication that the trunk line is active, i.e., off-hook. This would occur for the initial interconnect pattern check after system start-up and each subsequent time the sensing circuit 26 senses a ring voltage or an on-hook condition. A low-level amplitude sensing pulse is used when an off-hook condition is sensed or when the condition of the trunk line is unknown.

While the low-level amplitude sensing pulse is less likely to be perceived by telephone users, it is more likely to be masked out by loud speech or noise, in which case it would not be detected on the set lines 14 and the CPU board 22 would receive erroneous pulse detection data from the pulse detector 38, indicating that the interconnect pattern that had previously been established and detected no longer existed. To avoid such an error, when a low-level amplitude sensing pulse is applied, the CPU board 22 will not record a change in a previously detected interconnect pattern unless at least a preselected member of two or more low-level amplitude sensing pulses applied to the trunk line 12 indicate the nonexistence of the previously detected pattern.

Figures 4, 5:
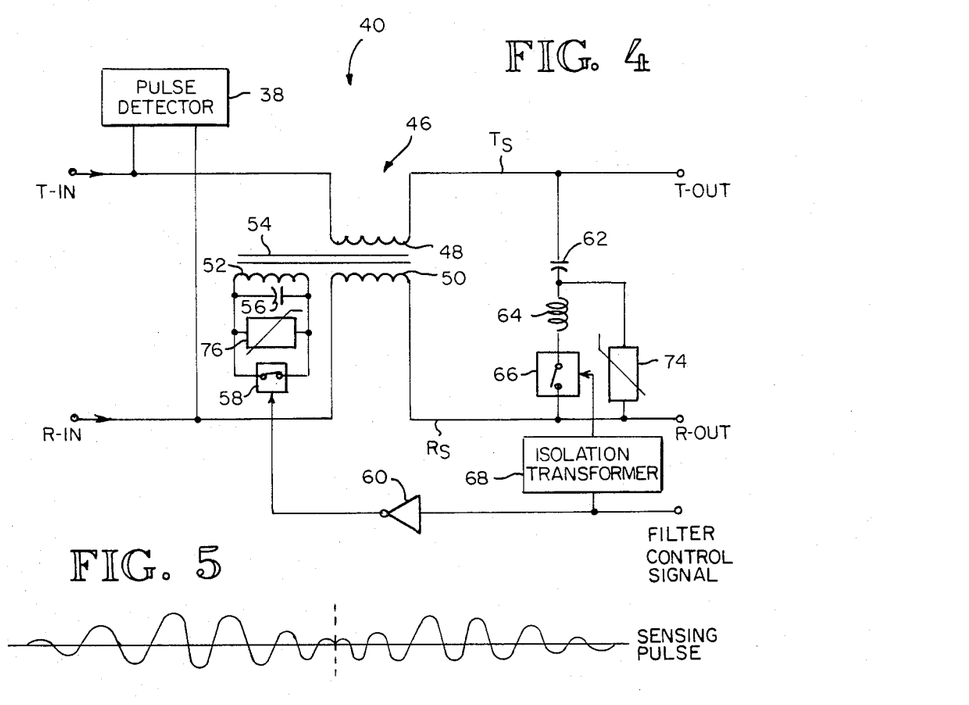
FIG. 4 is a schematic drawing of the switchable bandpass filter of the detection system of FIG. 1 used with the telephone set lines.
FIG. 5 is the waveform of a sensing pulse used by the detection system of FIG. 1.

To facilitate detection of the sensed pulse, the pulse has a sinusoidal waveform which is phase shifted by 180 degrees halfway through its period. The use of a sensing pulse with an out-of-phase second half substantially reduces the likelihood that any interfering signal or noise, even one with the frequency and amplitude of the sensing pulse, will be mistakenly taken as a sensing pulse since it is unlikely that an interfering signal or noise will demonstrate the necessary shift in phase. In addition to the use of phase shifting, the sinusoidal waveform of the sensing pulse has a gradually increasing amplitude at its beginning, a gradually decreasing amplitude prior to the midpoint shift in phase, once again a gradually increasing amplitude after the shift in phase occurs, and a gradually decreasing amplitude at the tail end of the pulse. By reducing the amplitude of the pulse at its beginning, midpoint and end, the amplitude of any unwanted frequency components which might be generated by transitions and not filtered out by the switchable filters 36 and 40, resulting in noise audible to a user, is avoided.

A conventional synchronous detector method is used which correlates the sensing pulse received on the set lines 14 with a sinusoidal reference signal corresponding to the sensing pulse. Known techniques are also used to compensate for any phase shift in the sensing pulse relative to the reference signal which may occur as a result of the sensing pulse traveling through the switching device 16. While the sensing pulse is of 10 milliseconds in duration, the pulse detector 38 scans the set lines 14 being monitored at a relatively high frequency or sampling rate to correlate any signals received on the set lines during the period of the sensing pulse with the reference signal.

Figure 3:
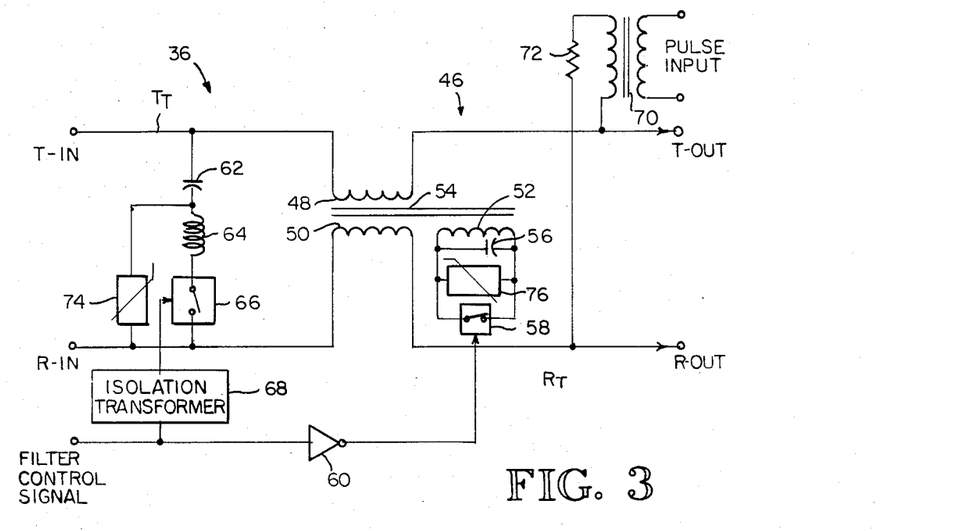
FIG. 3 is a schematic drawing of the switchable bandpass filter circuit of the detection system of FIG. 1 used with the telephone system trunk lines.

The switchable band-reject filter 36 of the trunk board 18 and the switchable band-reject filter 40 of the set board 20 are shown in greater detail in FIGS. 3 and 4, respectively. Since the filters 36 and 40 are identical in construction and operation, only one will be described in detail herein. Referring to FIG. 3, the filter 36 is connected between the input trunk tip and ring terminals T (in) and R (in) to which a trunk line coming from the telephone company switching equipment is connected, and the output trunk tip and ring terminals T (out) and R (out) to which the switching device 16 is connected. As previously noted, one filter 36 is provided for each of the sixteen trunk units of the trunk board 18. The filter 36 includes a first stage filter with a transformer 46 having three transformer coils 48, 50 and 52, and a core 54. Two of the transformer coils 48 and 50 are output coils connected in series with the tip line $T_T$ and the ring line $R_T$. The third transformer coil 52 is a control coil bridged by a capacitor 56 and a power field-effect transistor 58. The transformer 46 acts to transform the impedance on the control coil 52 to a proportionate impedance across each of the output coils 48 and 50 according to the turns ratio chosen between the control and output coils. The control coil 52 and the capacitor 56 provide a tuned inductance-capacitance, selectively tuned to the 2800 Hertz frequency of the sensing pulse, to provide a resonance frequency. Each of the output coils 48 and 50 acts as a parallel tuned circuit with a high impedance on resonance and a low impedance off resonance.

The field-effect transistor 58 is controlled by the filter control signal, and is maintained in a conducting state when the filter is not activated, indicated schematically in FIG. 3 as a normally closed switch. An inverter 60 provides the necessary inversion of the filter control signal to properly control the transistor 58. With the transistor 58 in a conducting state, the control coil 52 of the transformer 46 is short-circuited, and the impedance across the coil and the capacitor 56 is substantially zero. This impedance is transformed to the output coils 48 and 50, and, in effect, produces short-circuits to permit any signal present on the tip and ring lines $T_T$ and $R_T$ to be transmitted freely through the filter. With the transistor 58 in a nonconducting state, the impedance of the control coil 52 and the capacitor 56 is substantial for the resonant frequency, which is tuned to be the frequency of the sensing pulse; and this impedance is transformed to the output coils 48 and 50. Consequently, the output coils 48 and 50 present a high impedance on the tip and ring lines $T_T$ and $R_T$ frequency band of the sensing pulse, attenuating the pulse and inhibiting its outbound transmission while permitting speech and noise at all other frequencies to pass.

The filter 32 also includes a second stage filter with a capacitor 62, an inductor 64, and a second power field-effect transistor 66 in series which are connected across the tip and ring lines $T_T$ and $R_T$. The second transistor 66 is controlled by the filter control signal applied through an isolation transformer 68 to isolate the tip and ring lines from ground. The second transistor 66 is maintained in a nonconducting state when the filter 36 is not actuated, indicated schematically in FIG. 3 as a normally open switch. With the transistor 66 not conducting, the capacitor 62 and inductor 64 are effectively removed from the circuit and do not affect the signals which are transmitted over the trunk line. With the transistor 66 in a conducting state, the capacitor 62 and the inductor 64, which are also tuned to the 2800 Hertz frequency of the sensing pulse, present a low-impedance short-circuit across the tip and ring lines $T_T$ and $R_T$ in the frequency band of the sensing pulse to further attenuate the pulse.

Also shown in FIG. 3 is an isolation transformer 70 through which the sensing pulses are applied to the tip and ring lines $T_T$ and $R_T$ of the trunk line 12. The input terminals of the transformer 70 are connected to the multiplexer 34, which supplies the pulses generated by the tone generator 32 in response to the trunk unit select signal. One output terminal of the transformer 70 is connected directly to the tip line $T_T$ and the other terminal of the transformer is connected through a high-resistance blocking resistor 72 to the ring line $R_T$. The blocking resistor 72 provides sufficient isolation between the tip and ring lines $T_T$ and $R_T$ through the winding of the transformer 70, but allows injection of the sensing pulse.

In operation, when the trunk unit select signal causes a sensing pulse to be applied to the pulse injection isolation transformer 70, it also generates the filter control signal, which causes the field-effect transistor 58 to cease conducting and act as an open switch, and the field-effect transistor 66 to change to a conducting state and act as a closed switch. With the states of the field-effect transistors 58 and 66 so changed, the transformer 46 presents a high impedance on the tip and ring lines $T_T$ and $R_T$ and the capacitor 62 and the inductor 64 present a low impedance across the tip and ring lines to signals in the frequency band of the sensing pulse to attenuate the sensing pulse and inhibit its outbound transmission over the trunk line, while allowing its transmission through the switching device 16 and the transmission of all other frequency signals over the trunk line.

The switchable band-reject filter 40 of the set board shown in FIG. 4 operates in the same fashion as the filter 36 of the trunk board 18 just described. The filter 40 permits the sensing pulse applied to the input tip and ring terminals T (in) and R (in) of the set board 20 to be detected by the pulse detector 38, and attenuated to inhibit outbound transmission of the sensing signal over the set lines 14. The components of the set board filter 40 are accordingly assigned the same numerals as for the trunk board filter 36 and will not be described again herein. Likewise, the power field-effect transistors 58 and 66 of the set board filter 40 are controlled in the same manner described above for the trunk board filter 40 by the filter control signal applied through an inverter 60 and an isolation transformer 68 which are assigned the same numbers as the inverter and isolation transformer of the trunk board filter.

To provide for transient protection, a varistor 74 is connected in parallel across the inductor 64 and transistor 66, and another varistor 76 is connected in parallel with the control coil 52 and capacitor 56. The varistors 74 and 76 provide a low-resistance path if high voltage is applied across its terminals to protect the circuit from the effects of transient voltages such as might occur from lightning or other causes.

In an alternative embodiment of the invention for use with a switching device 16 having a bandwidth extending beyond the standard 300–3,000 Hertz audio-bandwidth, a sensing pulse may be used with a frequency within the bandwidth of the switching device 16, but above the standard audio-bandwidth. As above described, the filters 36 and 40 are tuned to the frequency of the sensing pulse, but since the frequency is above the upper limit of the audio-bandwidth, the filters may operate continuously without significantly affecting the lower frequency audio-signals being transmitted over the telephone lines. Consequently, the field-effect transistors 58 and 66, the isolation transformer 68, and the inverter 60 may be eliminated. While this embodiment of the invention functions well with a pbx having a switching device 16 with a bandwidth exceeding the standard telephone system bandwidth, many pbx do not have such a capability and the first described embodiment of the invention with selectively operable filters 36 and 40 must be used.

It will be appreciated that, although specific embodiments of the invention has been described herein for purposes of illustration, various modifications may be made without departing from the spirit and scope of the invention. Accordingly, the invention is not limited except as by the appended claims.

We claim:

1. A system for selectively determining, during operation, interconnect of a plurality of first telephone lines with a plurality of second telephone lines interconnected by a switching device, one of said plurality of first or second lines being telephone system trunk lines and the other being telephone set lines, and said switching device being a pbx or the like, said system comprising:
   means for selecting in sequential order ones of said first lines according to a predetermined logic, and generating operation signals;
   a pulse generator for generating a sensing pulse within the audio bandwidth of said switching device;
   means for selectively applying one of said sensing pulses to one of said selected first lines in response to said operation signals for transmission of said one sensing pulse through said switching device;
   a selectively operable first filter connected to said first lines, said first filter being operable in response to said operation signals to attenuate said sensing pulse for inhibiting outbound transmission of said sensing pulse over said first lines;
   a detector connected to said second lines for detecting the presence of said sensing pulse on any one or more of said second lines, and identifying said one or more second lines; and
   a selectively operable second filter connected to said second lines, said second filter being operable in response to said operation signals to attenuate said sensing pulse for inhibiting outbound transmission of said sensing pulse over said second lines.

2. The system of claim 1 wherein said first and second filters are band-reject filters, and said pulse generator generates a limited bandwidth pulse within the rejection bandwidth of said filters.

3. The system of claim 1, further including means for correlating subsequently determined interconnect patterns to determine if another one or more of said selected first lines is interconnected to said same one or more second lines, whereby an interconnect pattern involving more than one of said first lines may be determined.

4. The system of claim 1, further including a second detector connected to said first lines for detecting the presence of said sensing pulse on one or more of said first lines other than said selected one first line, and identifying said other one or more first lines.

5. The system of claim 1 wherein said first filter includes a plurality of filters, one connected to each of said first lines, and said second filter includes a plurality of filters, one connected to each of said second lines, said filters being activated in response to said operation signals during application of said sensing pulse to said selected first lines.

6. A system for selectively determining, during operation, interconnect patterns of a plurality of first telephone lines with a plurality of second telephone lines interconnected by a switching device, one of said plurality of first or second lines being telephone system trunk lines and the other being telephone set lines, and said switching device being a pbx or the like, said system comprising:
   means for selecting at least one line of said plurality of first lines according to a predetermined logic;
   means for generating a limited duration sensing signal having a frequency within the audio bandwidth of said switching device;

means for selectively applying said sensing signal to said selected first line;

means for inhibiting outbound transmission of said sensing signal over said selected first line, whereby said sensing signal will be transmitted through said switching device to one or more of said plurality of second lines connected to said selected first line by said switching device, but will go substantially undetected by a user with a telephone set connected to said selected first line;

means for detecting the presence of said sensing signal on any of said plurality of second lines, and indicating said one or more second lines whereon said sensing signal is detected, whereby the interconnect pattern of said selected first line with said one or more second lines existing during the duration of said sensing signal is determined; and means for inhibiting outbound transmission of said sensing signal over said one or more second lines, whereby said sensing signal will go substantially undetected by a user with a telephone set connected to one of said one or more second lines.

7. The system of claim 6 wherein said means for generating a limited duration sensing signal includes a pulse generator.

8. The system of claim 6 wherein said means for inhibiting outbound transmission of said sensing signal over said selected first line includes a selectively operable filter, said filter being operable during application of said sensing signal to said selected first line.

9. The system of claim 8 wherein said sensing signal is a limited bandwidth pulse, and said filter is a band-reject filter with a bandwidth at least coincidental with said pulse bandwidth for attenuation of said pulse.

10. The system of claim 8 wherein said means for inhibiting outbound transmission of said sensing signal over said one or more second line includes a plurality of selectively operable filters, one of said filters being connected to each of said plurality of second lines, said filters being operable during application of said sensing signal to said selected first line.

11. A system for selectively determining, during operation, interconnect of a plurality of first telephone lines with a plurality of second telephone lines interconnected by a switching device, one of said plurality of first or second lines being telephone system trunk lines and the other being telephone set lines, and said switching device being a pbx or the like, said system comprising:

a processor for selecting in sequential order ones of said first lines according to a predetermined logic, and generating operation signals;

a pulse generator for generating a limited bandwidth and duration sensing pulse within the audio bandwidth of said switching device and applying one of said sensing pulses to one or more of said selected first lines in response to said operation signals for transmission of said one sensing pulse through said switching device;

a selectively operable first filter connected to said first lines, said first filter being operable in response to said operation signals to attenuate said sensing pulse for inhibiting outbound transmission of said sensing pulse over said first lines;

a detector connected to said second lines for detecting the presence of said sensing pulse on any one or more of said second lines, and identifying said one or more second lines; and a selectively operable second filter connected to said second lines, said second filter being operable in response to said operation signals to attenuate said sensing pulse for inhibiting outbound transmission of said sensing pulse over said second lines.

12. The system of claim 11 wherein said first filter includes a band-reject filter connected to each of said first lines, said band-reject filters having a bandwidth at least coincidental with said pulse bandwidth for attenuation of said sensing pulse, and being individually and selectively activated upon application of said sensing pulse to one of said first lines to which said band-reject filter is connected.

13. The system of claim 12 wherein said second filter includes a band-reject filter connected to each of said second lines, said band-reject filter having a bandwidth at least coincidental with said pulse bandwidth for attenuation of said sensing pulse, and being individually and selectively activated under control of said processor.

14. The system of claim 12 wherein each of said band-reject filters includes a parallel resonant inductance-capacitance circuit connected in serial with one of said first lines, said circuit being tuned to said sensing pulse and being activated by a first switching device responsive to said operation signals.

15. The system of claim 14 wherein each of said band-reject filters further includes a series resonant inductance-capacitance circuit connected in parallel with one of said first lines, said circuit being tuned to said sensing pulse responsive to said operation signals and being actuated by a second switching device.

16. The system of claim 11 wherein said pulse generator generates said sensing pulse with a substantially sinusoidal waveform having a substantial phase shift partially through its period.

17. The system of claim 16 wherein said generated waveform has a gradually reduced amplitude at its beginning, phase shift and ending portions.

18. The system of claim 11 wherein said pulse generator selectively generates a low-level and a high-level amplitude sensing pulse, said low-level amplitude sensing pulse being used upon existence of a telephone line off-hook condition.

19. The system of claim 11 wherein said processor repeatedly commands said pulse generator to apply said sensing pulses to particular ones of said first lines to establish an interconnect pattern history.

20. The system of claim 11 wherein said detector repeatedly samples said second lines for the presence of said sensing pulse during the duration of one of said transmitted sensing pulses.

* * * * *